(12) United States Patent
Harrison et al.

(10) Patent No.: US 6,434,366 B1
(45) Date of Patent: Aug. 13, 2002

(54) METHOD AND SYSTEM FOR ESTIMATING ADAPTIVE ARRAY WEIGHTS USED TO TRANSMIT A SIGNAL TO A RECEIVER IN A WIRELESS COMMUNICATION SYSTEM

(75) Inventors: Robert M. Harrison, Grapevine; Kevin M. Laird, Keller, both of TX (US); David Myara, Toulouse; Soodesh Buljore, Montjay, both of (FR)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/584,626

(22) Filed: May 31, 2000

(51) Int. Cl.⁷ ................................................. H04B 7/00
(52) U.S. Cl. ..................... 455/69; 455/67.1; 455/70; 455/101; 455/562; 342/372; 342/378
(58) Field of Search .............................. 455/68, 69, 70, 455/76, 562, 101, 113, 136, 139, 522; 342/380–383, 378, 372; 375/267, 347

(56) References Cited

U.S. PATENT DOCUMENTS 5,812,542 A * 9/1998 Bruckert et al. ............. 375/267
5,923,700 A * 7/1999 Zhang ......................... 375/200
5,982,327 A * 11/1999 Vook et al. .................. 342/380
6,067,324 A * 5/2000 Harrison ...................... 455/522
6,087,986 A * 7/2000 Shoki et al. ................. 342/383
6,115,406 A * 9/2000 Mesecher .................... 375/267

* cited by examiner

Primary Examiner—William Trost
Assistant Examiner—Simon Nguyen
(74) Attorney, Agent, or Firm—L. Bruce Terry; Steven A. May

(57) ABSTRACT

A transmitter uses adaptive array weights to modify a gain and a phase of a communication signal to produce a plurality of element communication signals coupled to antenna elements in an adaptive array antenna. The communication signal is transmitted along with an element pilot signal that is coupled to one of the elements in the adaptive array antenna. In a receiver, the communication signal is received, and the element pilot signal is received. Thereafter, the adaptive array weights used at the transmitter are estimated in response to comparing characteristics of the received element pilot signal to characteristics of the received communication signal.

20 Claims, 8 Drawing Sheets

METHOD AND SYSTEM FOR ESTIMATING ADAPTIVE ARRAY WEIGHTS USED TO TRANSMIT A SIGNAL TO A RECEIVER IN A WIRELESS COMMUNICATION SYSTEM

FIELD OF THE INVENTION

The present invention is related in general to wireless communications systems, and more particularly to an improved method and system for estimating adaptive array weights used to transmit a signal to a receiver in a wireless communication system.

BACKGROUND OF THE INVENTION

A frequent goal in designing wireless communications systems is to increase the number of users that may be simultaneously served by the communications system. This may be referred to as increasing system capacity.

In code division multiple access (CDMA) wireless communications systems, the use of adaptive antenna arrays at the base transceiver has been proposed as a method of increasing system capacity. An adaptive array antenna includes two or more radiating elements having dimensions, spacing, orientation, and illumination sequences such that the fields for the individual elements combine to produce a field having greater intensities in some directions and lesser field intensities in other directions. An adaptive array antenna helps increase system capacity because this field pattern, or radiation pattern (which may include a plurality of beams or lobes), may be configured such that signals intended for a selected user are in higher-gain antenna lobes that are pointed in the direction of a propagation path to a selected user, while nulls in the antenna pattern are likely to be directed to other, non-selected users. Thus, a signal intended for the selected user may be directed toward a non-selected user with a lower power level. This increases capacity because the selected user's signal is not transmitted with a higher antenna gain to all the non-selected users in the sector or cell, thus not degrading the receiver performance of the non-selected users. While some non-selected users may be in a higher gain lobe, others are not, which makes all users statistically better able to receive their intended signals.

In prior art proposals for adaptive array transmitters that adjust their patterns on a per user basis, a high-power, per-user pilot is typically used. This is because proper coherent demodulation requires a pilot that is in phase with the traffic channel. Thus, if the pilot is not transmitted with the same antenna pattern as the traffic channel, the pilot phase will be shifted relative to the phase of the traffic channel, which means that it cannot be used as a reference for demodulation. In an adaptive array system having a pilot for each user, each user's pilot is added to the user's traffic channel, and modified in accordance with the weights (i.e., the gains and phases) used for creating the user's traffic channel illumination sequence.

Disadvantages of adding a pilot to each user's signal, where the pilot power is high enough to use a as a demodulation reference, include: (1) diminishing system capacity due to system overhead caused by each user having a pilot; (2) requiring longer pilot sequences to distinguish each pilot; (3) increasing the complexity of the pilot searcher in the subscriber unit due to the longer pilot sequences; (4) eliminating backward compatibility with existing CDMA cellular (IS-95) subscriber units; and (5) increasing soft handoff complexity because of the assignment of an additional pilot per user during soft handoff.

Adding a high-power per-user pilot for a demodulation reference may effectively eliminate the gain obtained by using an adaptive array. If we assume that a broadcast pilot takes up 7% of the total transmit power, and that per-user pilots use the same 7% of total transmitted power, 7% capacity is lost because broadcast pilots are still required for handoff purposes.

In order to demodulate a signal transmitted from an adaptive antenna array without a high-power per-user pilot, a pilot must be created, or synthesized in the receiver to provide a phase reference for the demodulator. To synthesize a pilot, it is helpful to know what "weights" were used at the transmitter to generate the signals applied to each antenna in the antenna array. These weights represent the set of gain and phase modifications made on a user's signal to generate each antenna element signal. The antenna element signals work together to form the transmission pattern of the antenna array.

One method of informing the receiver of the weights used at the transmitter is to send a message representing the weights. In a system that rapidly changes weights, the overhead of sending so many messages reduces system capacity for transmitting user traffic. Additionally, such a message stream will have an error rate, and an error in the weight message may further deteriorate capacity by causing the receiver to ask for more power because the wrong weight assumptions were used to synthesize a pilot, causing errors in demodulating a signal that otherwise had enough power for correct demodulation.

In the absence of weight messages, the ability to estimate adaptive array transmission weights used at the transmitter is useful in the pilot synthesizing process in the receiver. Weight estimation avoids the overhead of messaging and may avoid the consequences of erroneously receiving a weight message. Thus, it should be apparent that a need exists for a method and system of estimating adaptive array weights used to transmit a signal to a receiver in a wireless communication system, wherein the transmitter does not use high-power, per-user pilots or high-capacity, complex signaling between the base transceiver and the subscriber unit.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
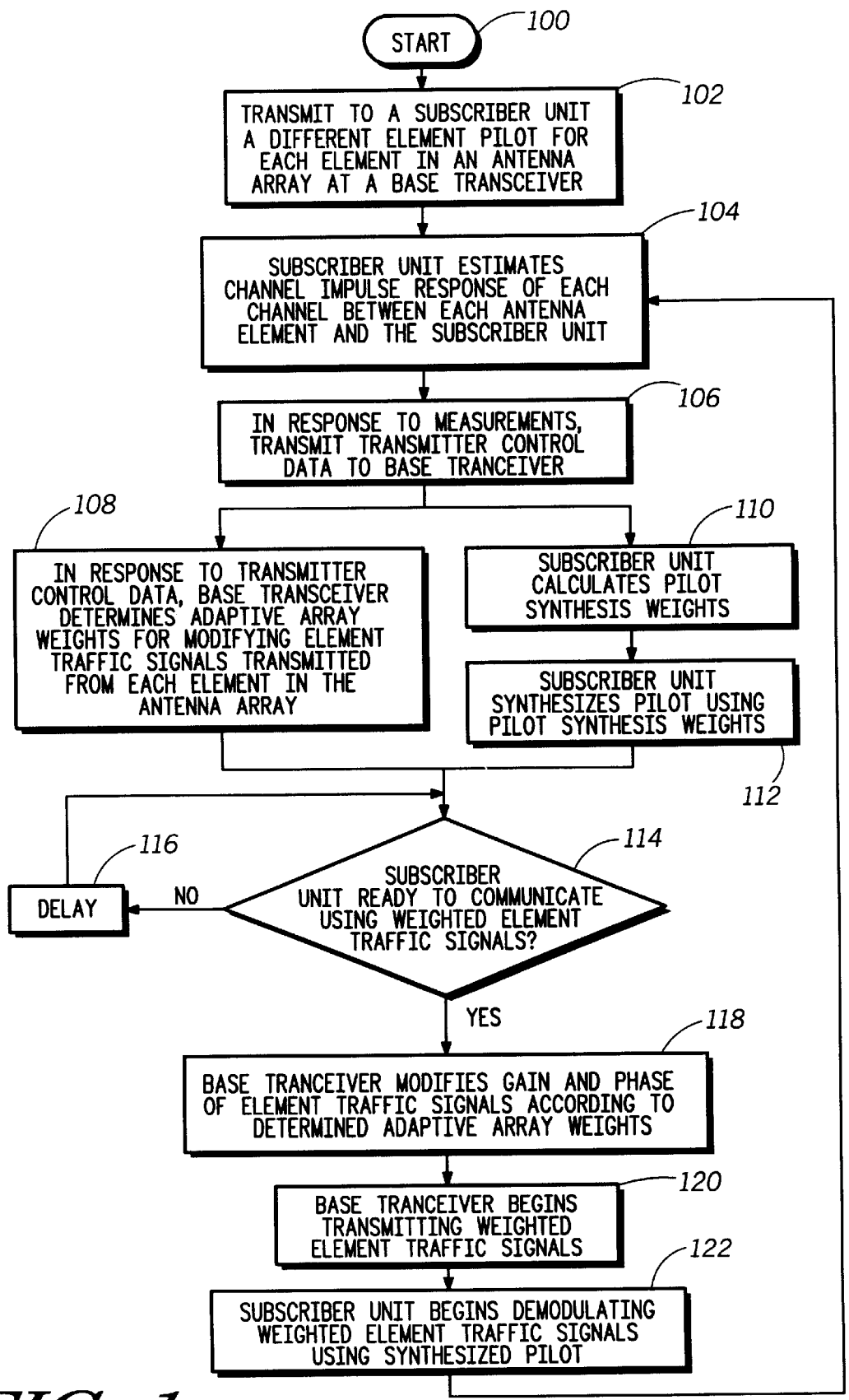
FIG. 1 is a high-level logic flowchart which illustrates the method and operation of transmitting and receiving a signal using an adaptive antenna array.

With reference now to the figures, and in particular with reference to FIG. 1, there is depicted a logic flowchart that illustrates the operation of a transmitter and receiver that synthesizes a pilot to be used as a demodulation reference. As illustrated, the process begins at block 100 and thereafter passes to block 102, wherein the system transmits to a subscriber unit a different element pilot for each element in an adaptive antenna array at a base transceiver. A pilot is a signal transmitted from a base transceiver to a subscriber unit for the purpose of providing a reference to the subscriber unit so that the subscriber unit can characterize the radio frequency (RF) channel. The pilot may also provide a phase reference for coherent demodulation. In a CDMA system the pilot may be implemented with a direct-sequence spread spectrum signal.

The element pilots are constructed to have low cross correlation. They are preferably constructed from orthogonal sequences, such as the Walsh-Hadamard sequences used in IS-95 (see TIA/EIA/IS-95-A, *Mobile Station-Base Station Capability Standard for Dual Mode Wide Band Spread Spectrum Cellular System*, March 1995, published by the Electronic Industries Association (EIA), 2001 I Street, N.W., Washington, D.C. 20006), but can be formed from low cross correlation sequences, such as different offsets of a pseudonoise (PN) sequence.

Next, the subscriber unit estimates the channel impulse response of each channel that extends from each antenna element to the subscriber unit, as illustrated at block 104. Note that the impulse response of each of these channels may include several rays, each propagating over different paths between the antenna element and the subscriber unit. Each channel impulse response may be estimated by using a matched filter that is matched to each element pilot. These matched filters have impulse responses that are the time-reversed complex conjugate of the element pilots. The matched filter lengths are set long enough to average out noise, but short enough so the filter is responsive to changes in the channel.

After estimating the channel impulse response, the subscriber unit transmits transmitter control data to the base transceiver, as depicted at block 106. The transmitter control data provides the base transceiver information necessary to modify the traffic channel signals in a way that enhances the gain of the antenna array for the particular location of the subscriber unit. In a preferred embodiment, the transmitter control data are the adaptive array weights that the subscriber unit recommends for the phase and gain modifications for each of the antenna elements at the base transceiver.

Rather than transmitting the weights, the transmitter control data may be an identifier that identifies a preselected set of weights selected from a "code book" containing all sets of weights that may be selected. When a single weight is used per element, the set of weights may also be referred to as a "weight vector." The code book is known to both the base transceiver and the subscriber unit. The preselected set of adaptive array weights may be referred to as a code book. In an alternate embodiment, the transmitter control data are the quantized channel impulse response measurements of each channel between each antenna element and the subscriber unit. In yet another embodiment, the transmitter control data may be an error rate indication which provides feedback to the base transceiver regarding the effectiveness of a recent selection of weights.

Following the transmission of transmitter control data, the process performs various steps at the base transceiver and at the subscriber unit, as shown by parallel paths in the flowchart. In the base transceiver, the process uses the transmitter control data to determine adaptive array weights for modifying the element traffic signals that are transmitted from each element in the antenna array, as illustrated at block 108. In a preferred embodiment, the base transceiver uses the transmit adaptive array weights recommended by the subscriber unit for driving each element in the antenna array. Alternatively, these adaptive array weights may be calculated in a manner similar to that described below with reference to the calculation of pilot synthesis weights used in synthesizing a pilot in the subscriber unit.

Referring now to operations in the subscriber unit, a set of pilot synthesis weights are computed based upon the estimated impulse response of the channels between each antenna element and the subscriber unit, as shown at block 110. In a preferred embodiment, these pilot synthesis weights are computed to deliver the maximum power to the subscriber. When one adaptive array weight is used per element, the pilot synthesis weights which deliver maximum power are the elements of the eigenvector corresponding to the maximum eigenvalue of the channel impulse response sample autocorrelation matrix, $R_A$, which is defined below:

$$w = e_{max} \qquad \text{Equation 1:}$$

$$R_A e_{max} = \lambda_{max} e_{max} \qquad \text{Equation 2:}$$

Equation 3:

$$R_A \equiv A^H A; \quad A \equiv \begin{bmatrix} \alpha_1(1) & \alpha_2(1) & \cdots & \alpha_N(1) \\ \alpha_1(2) & \alpha_2(2) & & \alpha_N(2) \\ \vdots & \vdots & \ddots & \vdots \\ \alpha_1(M) & \alpha_2(M) & \cdots & \alpha_N(M) \end{bmatrix}$$

where M is the number of taps in the channel impulse response, N is the number of elements in the antenna array, w is the adaptive array weight vector, $\alpha_i(j)$ is the value of the estimated channel impulse response of the channel from the $i^{th}$ antenna element to the subscriber at delay j, $\lambda_{max}$ is the maximum eigenvalue, and $e_{max}$ is the eigenvector corresponding to the maximum eigenvalue. This equation also applies when an adaptive array is used for reception at the mobile. In this case each row of the A matrix corresponds to a delay on a particular antenna. Therefore, when there are L receive antennas at the mobile, there are LM rows and N columns in A:

Equation 4:

$$A \equiv \begin{bmatrix} \alpha_{1,1}(1) & \alpha_{2,1}(1) & \cdots & \alpha_{N,1}(1) \\ \alpha_{1,2}(1) & \alpha_{2,2}(1) & \cdots & \alpha_{N,2}(1) \\ \vdots & \vdots & \cdots & \vdots \\ \alpha_{1,L}(1) & \alpha_{2,L}(1) & \cdots & \alpha_{N,L}(1) \\ \alpha_{1,1}(2) & \alpha_{2,1}(2) & \cdots & \alpha_{N,1}(2) \\ \alpha_{1,2}(2) & \alpha_{2,2}(2) & \cdots & \alpha_{N,2}(2) \\ \vdots & \vdots & \cdots & \vdots \\ \alpha_{1,L}(2) & \alpha_{2,L}(2) & \cdots & \alpha_{N,L}(2) \\ \alpha_{1,1}(M) & \alpha_{2,1}(M) & \cdots & \alpha_{N,1}(M) \\ \alpha_{1,2}(M) & \alpha_{2,2}(M) & \cdots & \alpha_{N,2}(M) \\ \vdots & \vdots & \cdots & \vdots \\ \alpha_{1,L}(M) & \alpha_{2,L}(M) & \cdots & \alpha_{N,L}(M) \end{bmatrix}$$

where $\alpha_{i,j}(k)$ is the response from the $i^{th}$ transmit antenna to the $j^{th}$ receive antenna at delay k.

When multiple weights are used per element, the adaptive array weights may be the complex conjugate of the normalized channel impulse response estimates. In this case, the vector of weights at element i may be written:

Equation 5:

$$w_i = \frac{[\alpha_i^*(1)\alpha_i^*(2) \cdots \alpha_i^*(M)]}{\left(\sum_{l=1}^{M} \sum_{k=1}^{N} |\alpha_l(k)|^2\right)^{1/2}}$$

where "*" indicates the complex conjugate.

According to an important aspect of the present invention, the method of calculating adaptive array weights at the base transceiver for modifying element traffic signals is mathematically related to, or coordinated with, the method the subscriber unit uses to calculate pilot synthesis weights.

After calculating pilot synthesis weights, the process synthesizes a pilot using the pilot synthesis weights, as illustrated at block 112. This "synthesized pilot" is created by summing weighted versions of estimated channel impulse responses. Thus, the synthesized pilot describes the gain and phase of the "composite" channel, which comprises all paths of all rays between all antenna elements and the subscriber unit. Because the synthesized pilot contains information that more completely describes the composite channel, the synthesized pilot is a good reference for coherently demodulating the traffic channel received at the subscriber unit.

The timing or synchronization of the use of weights in transmitting and demodulating must be carefully coordinated between the base transceiver and the subscriber unit. If, for example, the transceiver changes adaptive array weights for modifying element traffic signals before the subscriber unit calculates pilot synthesis weights and synthesizes a pilot, the weights could be substantially different, and errors will most likely result at the subscriber unit. Thus, as depicted at block 114, the process includes a step of determining that the subscriber unit is ready to receive the weighted element traffic signals that have been weighted with newly calculated adaptive array weights. If the subscriber unit is not ready, the process delays, as illustrated at block 116. Note that the embodiment shown in FIG. 1 assumes the base weights for a slow subscriber unit. In alternative embodiments of the present invention, this step of synchronizing the transition to new weights may require that the subscriber unit wait for the base transceiver. In any event, the slower unit may notify the faster unit that it is ready to use newly calculated weights, or the two units can agree to delay before the transition for a predetermined period of time that exceeds the time needed to calculate weights in either unit. Thus, the determining readiness step includes a message to indicate readiness, or a delay for a period needed to synchronize the transition.

After synchronizing the transition to newly calculated weights, the base transceiver modifies the gain and phase of each element traffic signal according to the determined adaptive arrays weights for modifying element traffic signals, as illustrated at block 118. Next, the base transceiver begins transmitting the weighted element traffic signals, as depicted at block 120. At a coordinated time, the subscriber unit next begins demodulating the weighted element traffic signals using the synthesized pilot, as illustrated at block 122. Thereafter, the process iteratively returns to block 104, wherein the channel impulse response measurements are updated, adaptive array and pilot synthesis weights are recalculated, and a transition to the newly calculated weights is synchronized as described above.

Figure 2:
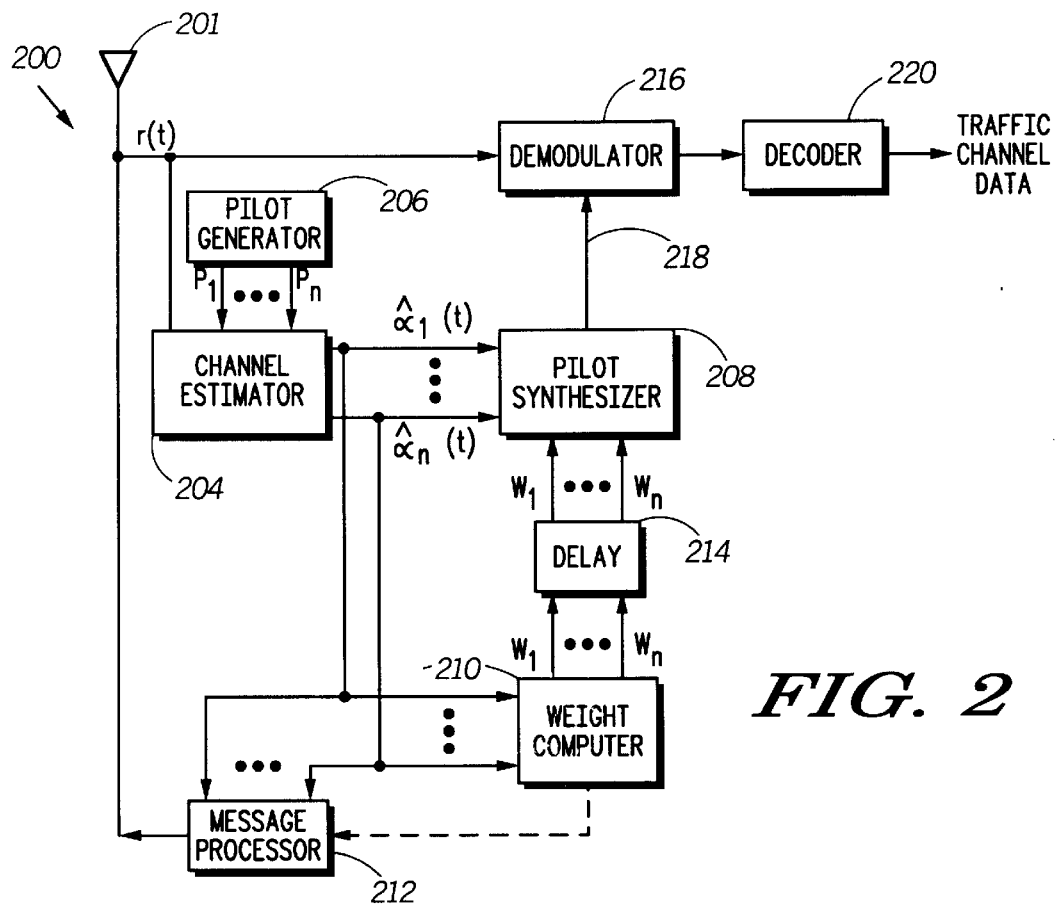
FIG. 2 depicts a subscriber unit that synthesizes a pilot for demodulating a signal transmitted with an adaptive antenna array.

With reference now to FIG. 2, there is depicted a subscriber unit for implementing the method and system of synthesizing a pilot signal. As illustrated, subscriber unit 200 includes antenna 201 for receiving and transmitting signals to and from a base transceiver.

Antenna 201 is coupled to channel estimator 204, which is used to estimate a channel impulse response for each channel between each antenna element at the transceiver base station and antenna 201. Inputs to channel estimator 204 are coupled to pilot generator 206, which generates pilot signals $P_1$–$P_n$ that correspond to element pilots used on each antenna element of the antenna array at the base transceiver.

The output of channel estimator 204 is a group of vectors, $\hat{\alpha}_i(t)$–$\hat{\alpha}_n(t)$, that describe the impulse response of channels between each base transceiver antenna element and subscriber antenna 201. These vectors are coupled to inputs at pilot synthesizer 208, weight computer 210, and message processor 212.

Message processor 212 sends to the base transceiver transmitter control data that is used to determine the adaptive array weights. This transmitter control data may include recommended adaptive array weights that were calculated in the subscriber unit. Alternatively, the transmitter control data may be a representation of the channel impulse response measurements from channel estimator 204. These representations may be quantized representations of the channel impulse response vectors. In yet another embodiment, the transmitter control data may be a message indicating a channel error rate, which may be used to indicate the effectiveness of the sets of adaptive array and pilot synthesis weights selected at the base transceiver and the subscriber unit, respectively.

Weight computer 210 receives as inputs the channel impulse response vectors and calculates the weights that the subscriber unit uses to synthesize a pilot. In a preferred embodiment, weight computer 210 may also compute recommended adaptive array weights and send the recommended weights to message processor 212, as shown with a dashed line between weight computer 210 and message processor 212. Message processor 212 in turn communicates the recommended weights to the base transceiver so the transceiver can use them in transmitting element traffic signals.

The pilot synthesis weights output by weight computer 210 may be delayed by delay circuit 214 before being transferred to pilot synthesizer 208. The purpose of this delay is to synchronize the transition from the previous set of weights to the newly calculated set of weights at both the subscriber unit and the base transceiver. In some embodiments, the duration of delay 214 may be zero because the base transceiver is waiting for subscriber unit 200 to calculate pilot synthesis weights in weight computer 210.

Following the synchronization delay, the calculated pilot synthesis weights are input into pilot synthesizer 208 wherein a pilot is synthesized and used in demodulator 216 to demodulate traffic signals. Within demodulator 216, synthesized pilot 218 is used as a reference for coherent demodulation. Demodulator 216 may be implemented with a RAKE receiver, in which case the output of demodulator 216 is a despread baseband combination of RAKE fingers.

The output of demodulator 216 is coupled to decoder 220, which may be implemented with a Viterbi decoder. The output of decoder 220 is traffic channel data, which may represent voice or user data and be passed on to the subscriber unit user in an appropriate manner.

Figure 3:
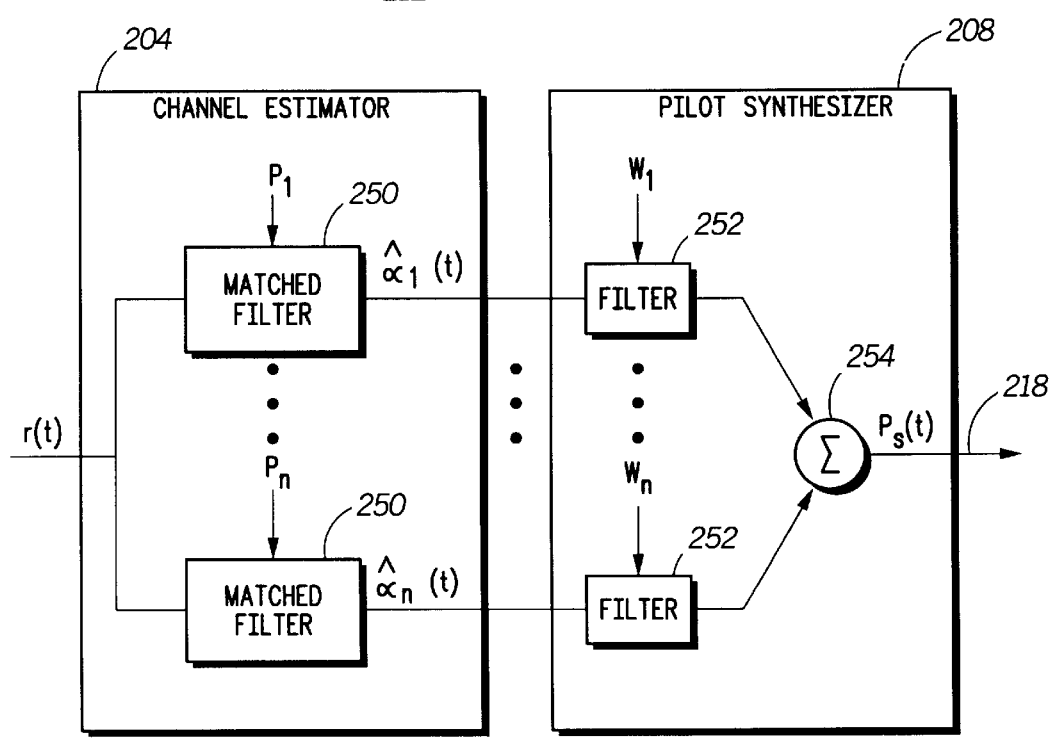
FIG. 3 depicts a more detailed diagram of a channel estimator and a pilot synthesizer, which are shown in FIG. 2.

With reference now to FIG. 3, there is depicted a more detailed diagram of a channel estimator and a pilot synthesizer, as shown in FIG. 2. The input to channel estimator 204 is the baseband signal r(t) from antenna 201. Note that a downconversion process that downconverts RF to baseband signal r(t) is not shown. Within channel estimator 204 baseband signal r(t) is coupled to matched filters 250. These matched filters also have inputs from pilot generator 206, shown in FIG. 3 as pilots $P_1$–$P_n$.

Matched filters 250 perform a matched filter operation using the baseband received signal r(t) and the pilots $P_1$–$P_n$ as described above. The output of each matched filter 250 is the channel impulse response estimate of the channel from each antenna element to the subscriber unit.

The channel impulse response estimates are then coupled to pilot synthesizer 208. Pilot synthesizer 208 includes filters 252 which filter the channel impulse response estimates with the pilot synthesis weights $W_1$–$W_N$, which are output by delay 214. $W_1$–$W_N$ correspond to $w_1$–$w_N$ in the equations above. When there is one adaptive array weight per element, $w_{1-wN}$ are scalars, and when there are multiple taps per element, they are vectors. In this embodiment, the weights used are those that were communicated to the base transceiver. Filters 252 may be implemented with a single tap filter, in which case the impulse response estimates are each multiplied by pilot synthesis weights $W_1$–$W_N$.

The output of filters 252 are coupled to summer 254 which adds all the outputs. The output of summer 254 is synthesized pilot 218, which is an impulse response vector equivalent to a single pilot transmitted with the adaptive array using weights $W_1$–$W_N$.

Figure 4:
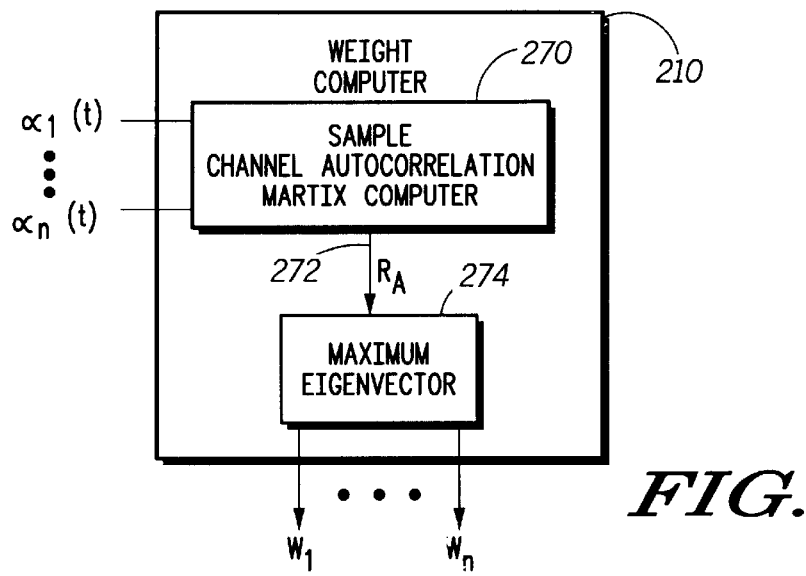
FIG. 4 is a more detailed illustration of a weight computer, which is shown in FIG. 2.

With reference now to FIG. 4, there is depicted a more detailed illustration of weight computer 210, which is shown in FIG. 2. As illustrated, weight computer 210 includes sample channel autocorrelation matrix computer 270. Matrix computer 270 receives channel impulse response estimates from channel estimator 204 and computes the sample channel autocorrelation matrix, $R_A$ 272, as described above.

Matrix $R_A$ 272 is then input into maximum eigenvector calculator 274 which computes the eigenvector corresponding to the maximum eigenvalue of sample channel autocorrelation matrix, $R_A$ 272. The output of maximum eigenvector calculator 274 are the elements of the maximum eigenvector, shown here as $W_1$–$W_N$, the pilot synthesis weights.

Figure 5:
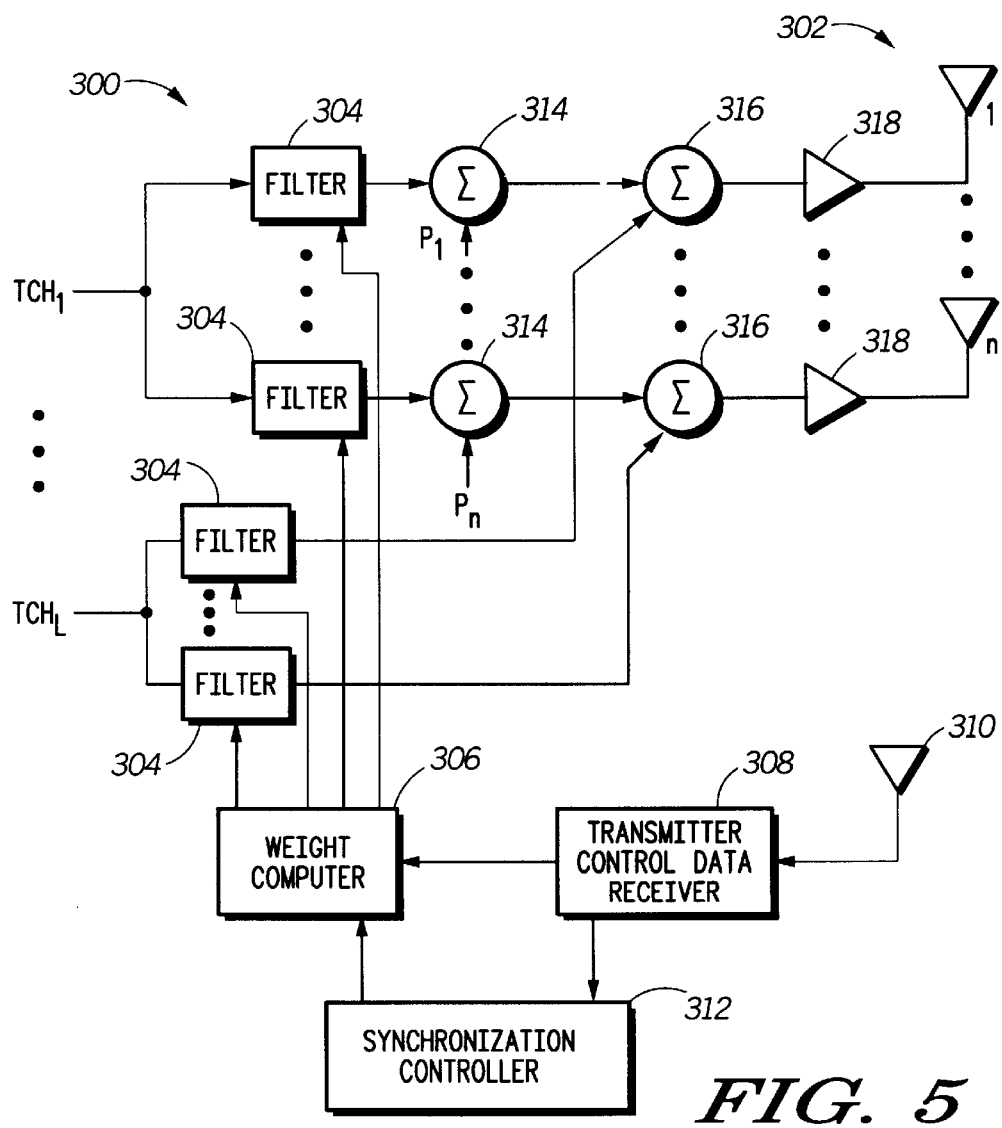
FIG. 5 depicts a base transceiver that uses an adaptive antenna array in accordance with the method and system of the present invention.

With reference now to FIG. 5, there is depicted a base transceiver for transmitting and synchronizing communication of a signal using an adaptive antenna array. As illustrated, base transceiver 300 includes traffic channel data, shown $TCH_1$–$TCH_L$, for one or more users. Each traffic channel is split N-ways to provide a source of traffic channel data for each element in N-element antenna array 302.

After splitting the signal N-ways, each of the N signals is input into filters 304, which are used to create the weighted element traffic signals for each element of antenna array 302. Filters 304 receive adaptive array weights from weight computer 306.

Adaptive array weights output by weight computer 306 are determined based upon transmitter control data received by transmitter control data receiver 308. Transmitter control data receiver 308 receives an input from antenna 310, which may or may not be an element in antenna array 302. In a preferred embodiment, transmitter control data receiver 308 receives recommended adaptive array weights from subscriber unit 200. Weight computer 306 then uses the recommended adaptive array weights to control filters 304.

In an alternative embodiment, transmitter control data receiver 308 may receive quantized channel impulse response estimates from subscriber 200, which are then passed to weight computer 306 for calculating adaptive array weights in a manner similar to the calculation of pilot synthesis weights in subscriber unit 200, as discussed with reference to FIGS. 4 and 5.

Synchronization controller 312 determines whether or not the subscriber unit is ready to receive element traffic signals modified with the newly determined adaptive array weights. When the subscriber unit is ready, synchronization controller 312 initiates a change to the newly calculated adaptive array weights in weight computer 306. Thus, new adaptive array weights are used in filters 304 at a time determined by synchronization controller 312.

After element traffic signals have been weighted by filters 304, element pilots $P_1$–$P_N$ are added to the weighted traffic element signals by summers 314. Pilots $P_1$–$P_N$ correspond to antenna elements 1–N in antenna array 302. At subscriber unit 200, the channels associated with antenna elements 1–N are uniquely characterized by the ability to distinguish pilots $P_1$–$P_N$ from one another.

Following summers 314, summers 316 add L weighted element traffic signals from the other L traffic channels to form the N signals that will be transmitted over each element in antenna array 302.

Coupled to the outputs of summers 316 are upconverters 318, which may be used to convert the signals output by summers 316 to radio frequency signals suitable for transmission.

In the adaptive antenna array communication system described above, it is assumed that subscriber unit 200 and base transceiver 300 can communicate and synchronize the use of adaptive array weights without error. In order to achieve better results, the subscriber unit, or receiver, may independently estimate the weights that were used to transmit the signal from the adaptive antenna array, as discussed in further detail below.

Figure 6:
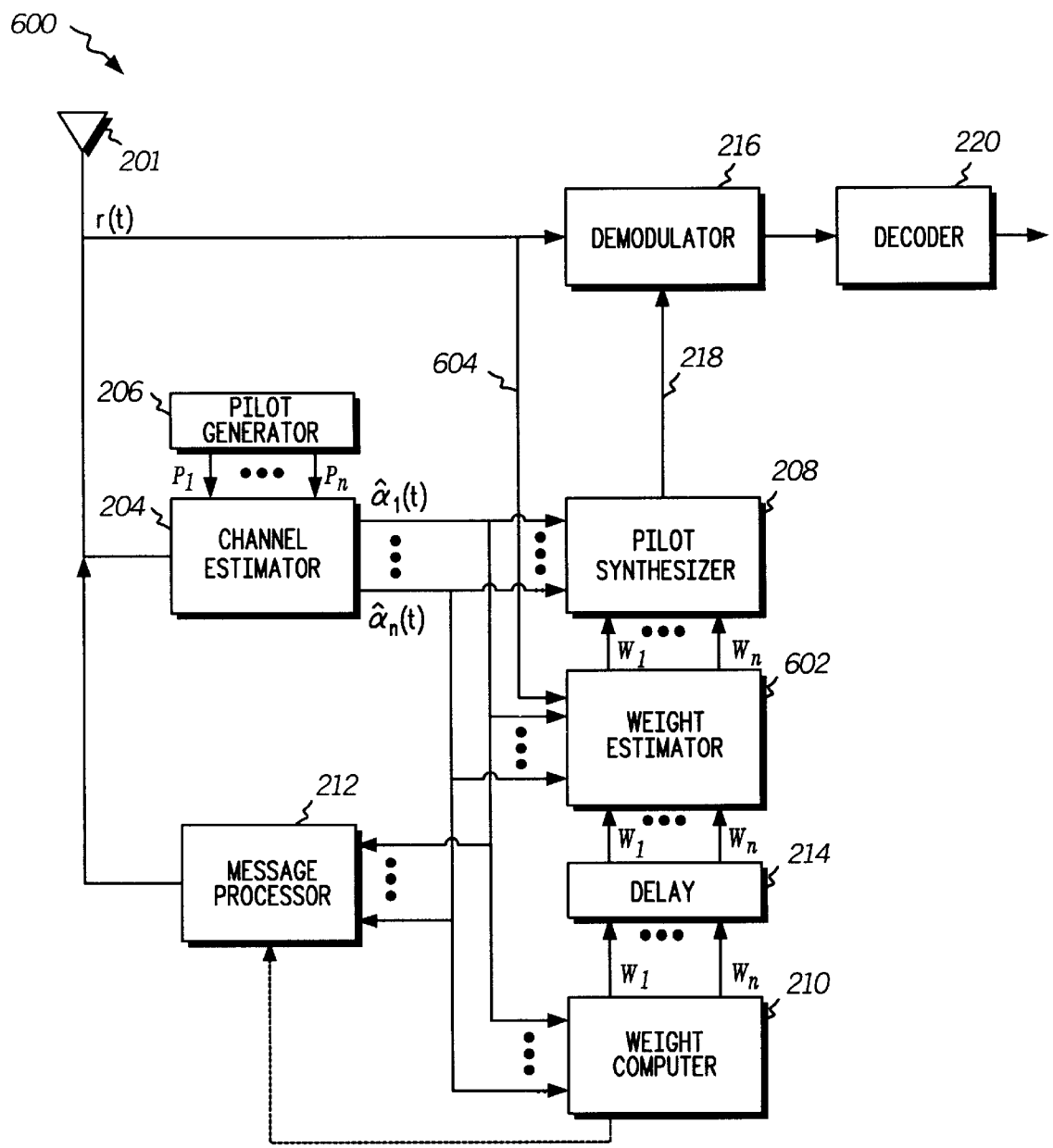
FIG. 6 depicts a subscriber unit for synthesizing a pilot using estimated adaptive array weights in accordance with the method and system of the present invention.

Referring now to FIG. 6, there is depicted a high-level block diagram of a receiver that uses estimates of adaptive array weights for synthesizing a pilot in accordance with the method and system of the present invention. As illustrated, receiver 600 includes many of the same functional blocks used in receiver 200 shown in FIG. 2. Where the functional blocks are the same, the reference numerals are the same as shown in FIG. 2.

A new functional block that is not included in FIG. 2 is weight estimator 602. According to an important aspect of the present invention, pilot synthesizer 208 synthesizes pilot 218 using estimated weights output by weight estimator 602. Estimated weights are used for pilot synthesis rather than using weights output by weight computer 210 through delay 214, as shown in FIG. 2. By using estimated weights, synthesized pilot 218 may more accurately be based upon weights actually selected and used at the transmitter than when weights that were computed by weight computer 210, and passed to the transmitter via an imperfect messaging uplink, are used. This means that if the base station did not select weights requested by weight computer 210, or if weights from message processor 212 are miscommunicated, synthesized pilot 218 is a better reference for demodulation because it is based upon what was actually used at the base station to transmit the signal.

Figure 7:
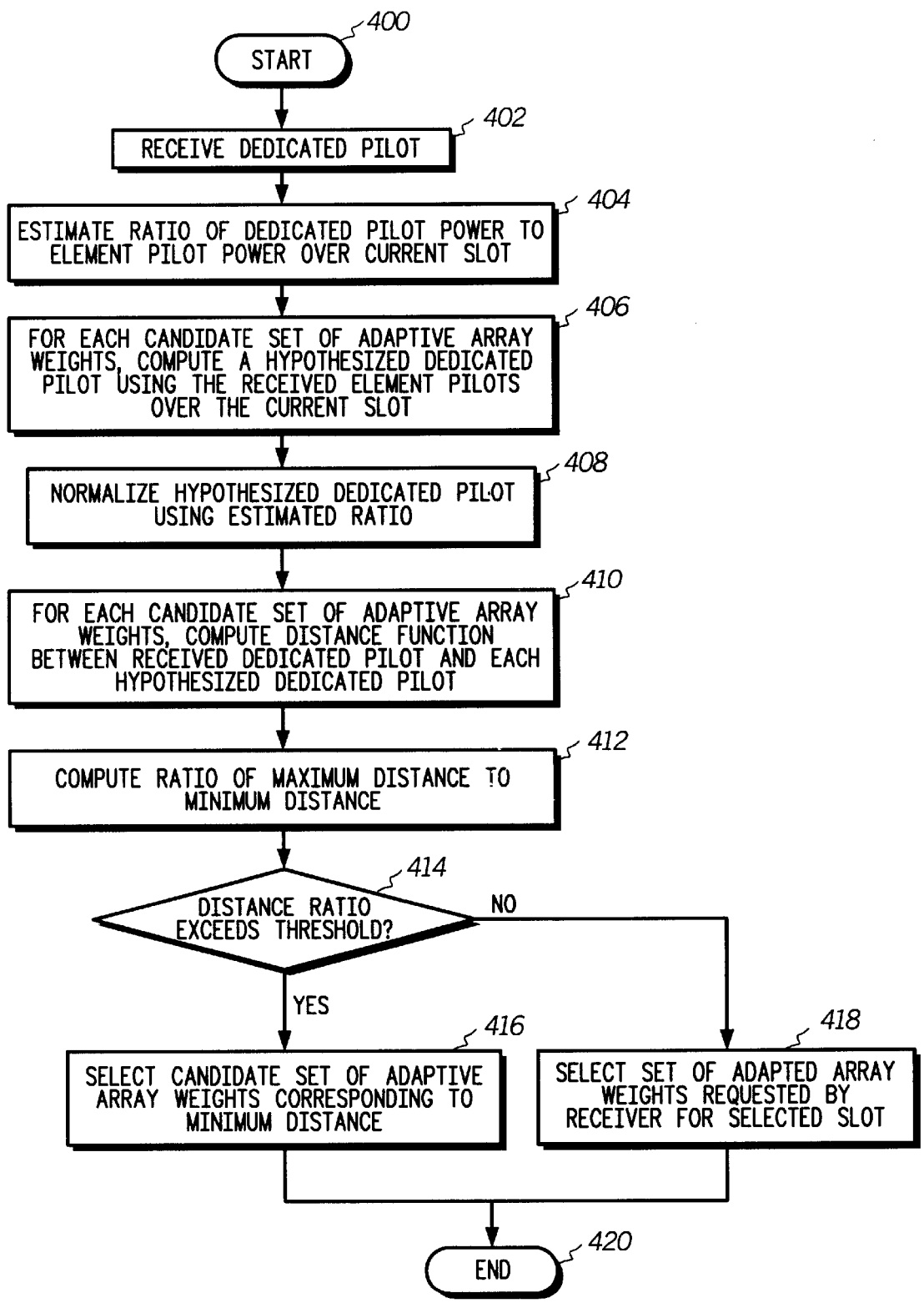
FIG. 7 is a high-level logic flowchart depicting the method and operation of estimating adaptive array weights when a dedicated pilot is used to transmit a communication signal from a transmitter to a receiver in a wireless communication system in accordance with the method and system of the present invention.
Figure 8:
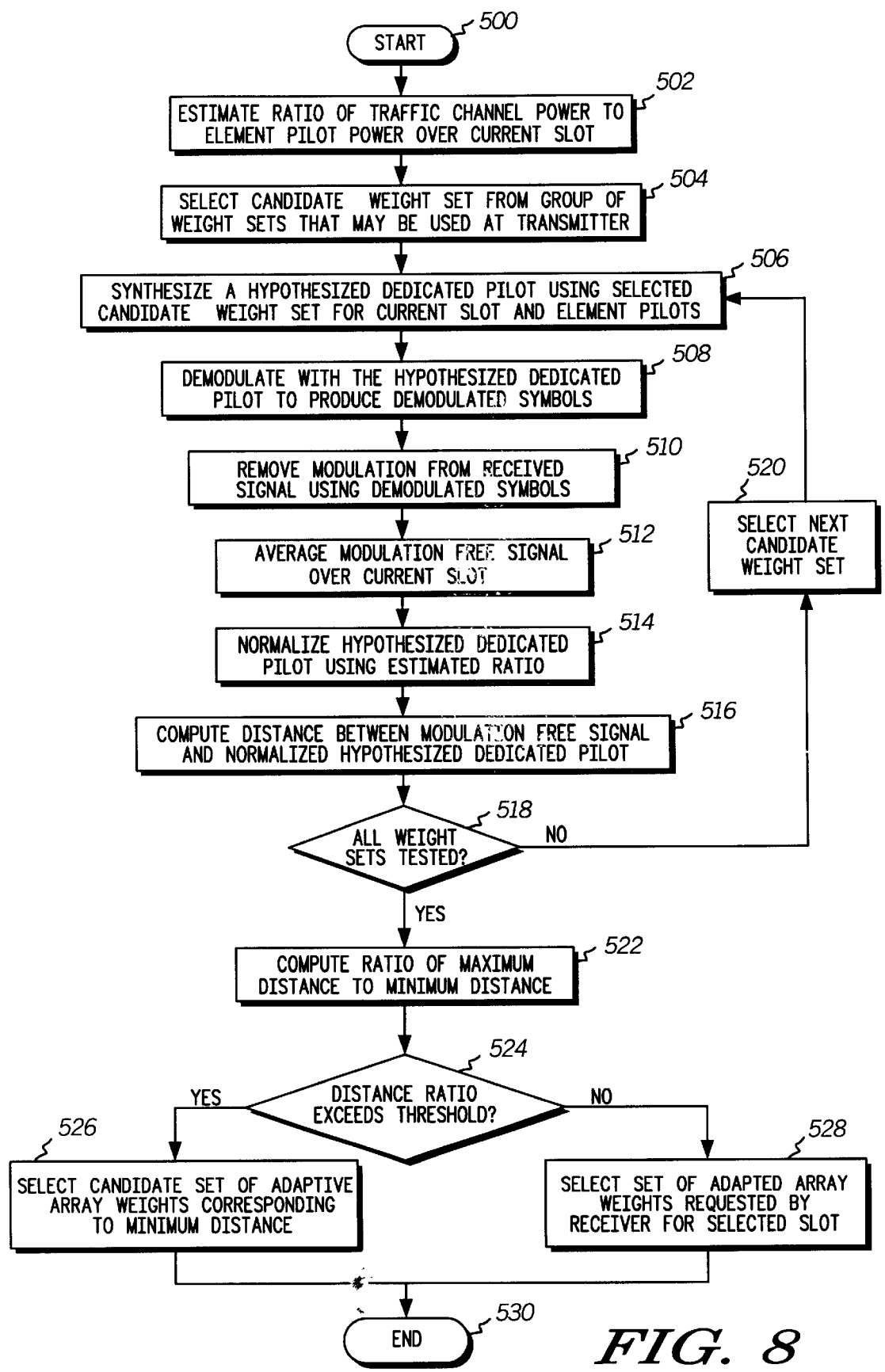
FIG. 8 is a high-level logic flowchart depicting the method and operation of estimating adaptive array weights when a dedicated pilot is not used to transmit a communication signal from a transmitter to a receiver in a wireless communication system in accordance with the method and system of the present invention.
Figure 9:
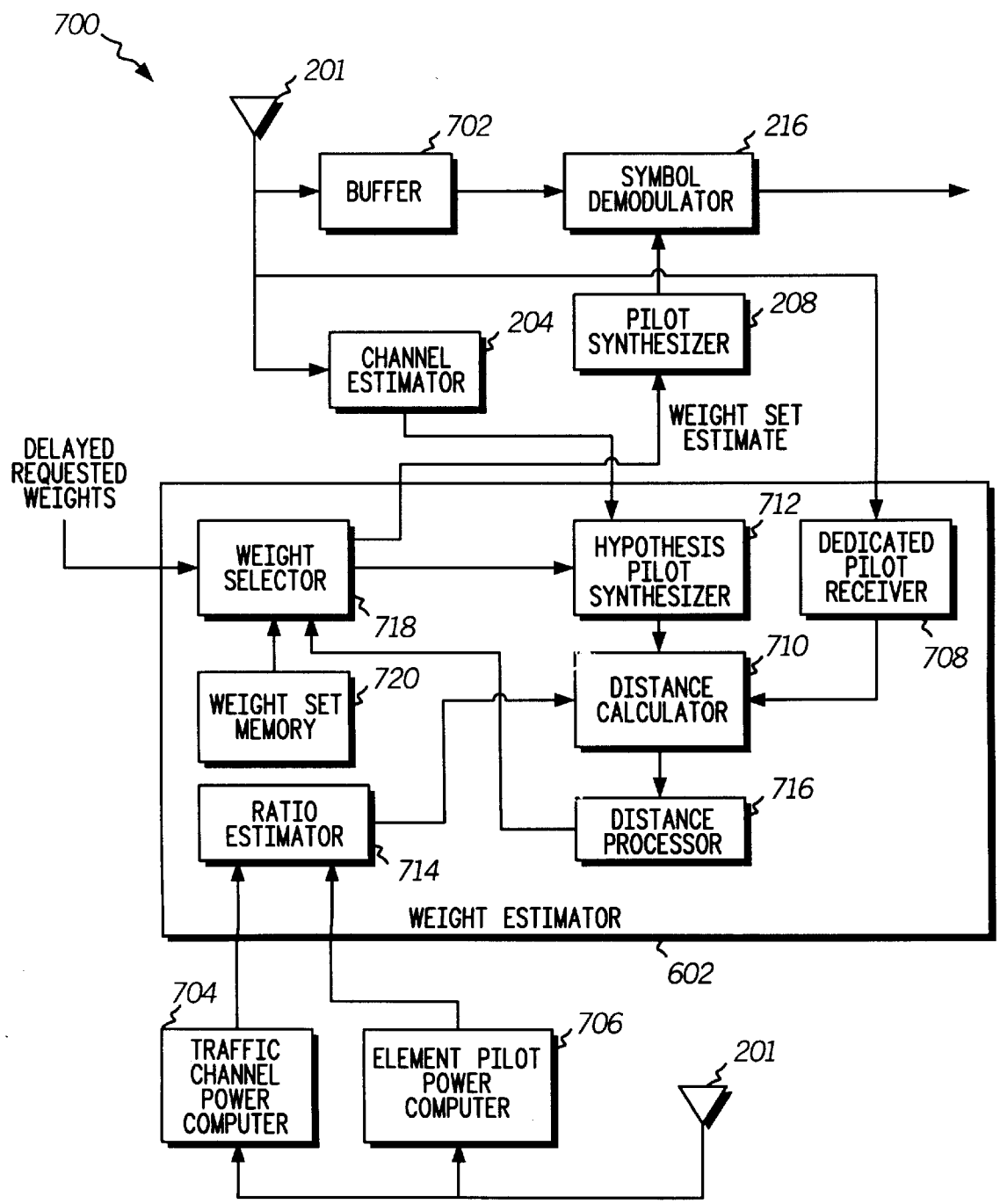
FIG. 9 is a high-level block diagram of portions of a receiver that estimates adaptive array weights when a dedicated pilot is used to transmit a communication signal from a transmitter to a receiver in a wireless communication system in accordance with the method and system of the present invention.

Details regarding the operation of weight estimator 602 are discussed and illustrated with regard to FIGS. 7 through 10. In the embodiment of FIGS. 7 and 9, weight estimator 602 relies upon a dedicated pilot in order to estimate weights. In FIG. 9, reference numeral 708 shows a dedicated pilot receiver in weight estimator 602, which is coupled to antenna 201.

Figure 10:
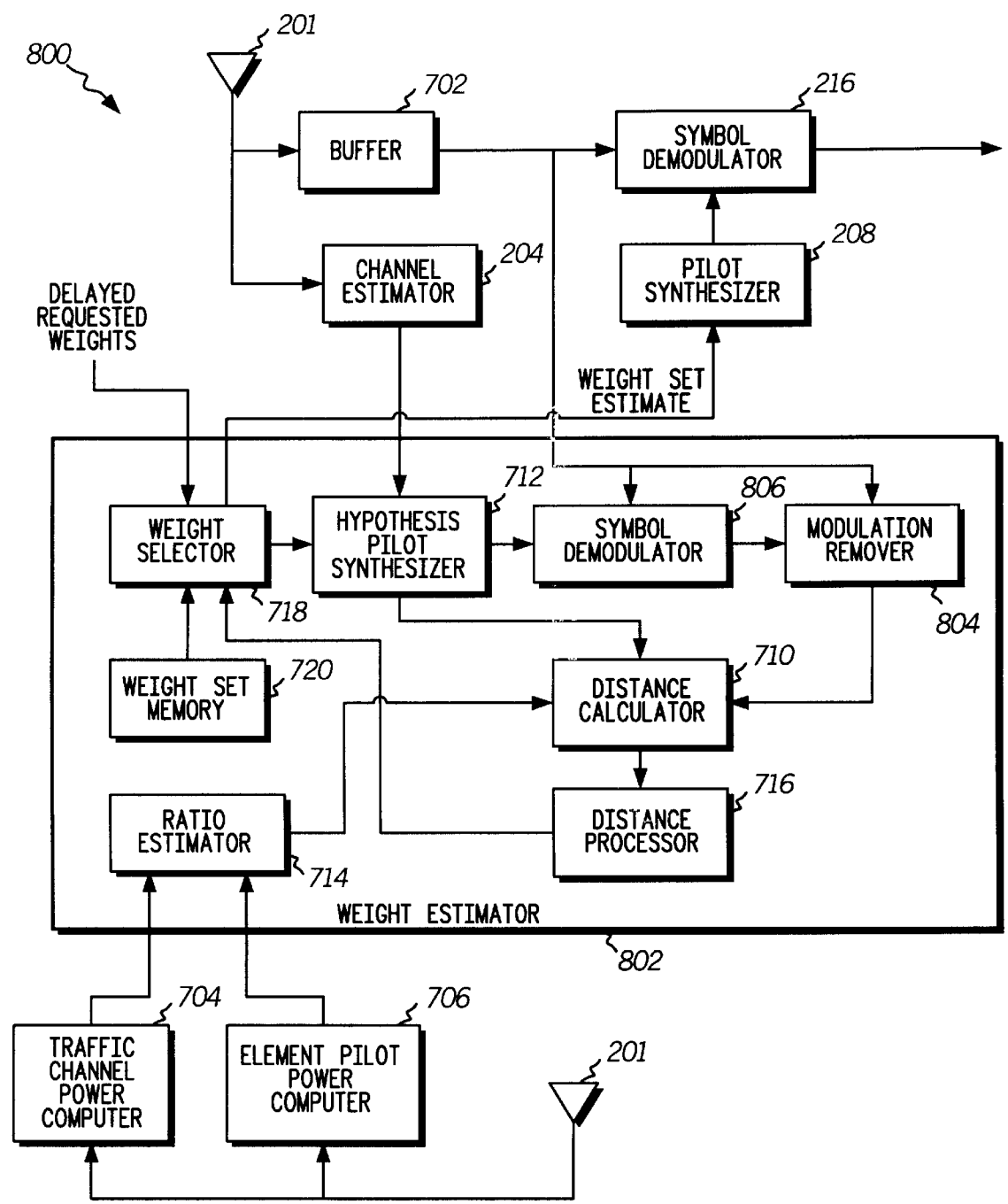
FIG. 10 is a high-level block diagram of portions of a receiver that estimates adaptive array weights when a dedicated pilot is not used to transmit a communication signal from a transmitter to a receiver in a wireless communication system in accordance with the method and system of the present invention.

In the embodiment of FIGS. 8 and 10, weight estimator 802 does not use a dedicated pilot, but instead uses a processed demodulator output in estimating weights.

With reference now to FIG. 7, there is depicted a high-level logic flowchart depicting the method and operation of estimating adaptive array weights when a dedicated pilot is used to transmit a communication signal from a transmitter to a receiver in a wireless communication system. As illustrated, the process begins at block 400 and thereafter passes to block 402, wherein the receiver receives a dedicated pilot signal intended for the particular subscriber unit. The dedicated pilot is a known signal transmitted using the adaptive array weights that are used for the subscriber's traffic. The dedicated pilot is also assigned to a particular subscriber unit. The dedicated pilot is transmitted on a known resource, such as a code, or a scheduled time, or a combination of code and scheduled time. In base transceiver 300 in FIG. 5, the dedicated pilot signal is a component of signals TCH$_1$–TCH$_2$, which are the users' traffic signals. The dedicated pilot may be code division or time division multiplexed into the users' signal.

After receiving the dedicated pilot, the process estimates a ratio of dedicated pilot power to element pilot power over a time period of a current slot, as illustrated in block 404. For this example it is assumed that the element pilot powers are the same. If different powers are used, the ratio may be estimated in a manner that compensates for the different powers. The dedicated pilot power and element pilot powers may be measured by despreading, using despreading codes for the dedicated pilot and element pilots, and averaging the despread power over a slot. In a preferred embodiment the slot coincides with a power control group, which means that transmitted power is constant over the slot. In estimating the ratio when element pilot powers are equal, the element pilot power may be computed as the average of the element pilot powers.

Once the ratio of dedicated pilot power to element pilot power has been estimated, hypothesized dedicated pilots are computed, for each candidate set of adaptive array weights, by using the received element pilots over the current time slot, as illustrated at block 406. Each hypothesized dedicated pilot computation assumes a set of weights that may be selected at the transmitter for producing weighted element traffic signals for each element of antenna array 302 in FIG. 5.

Next, the process normalizes the hypothesized dedicated pilots using the estimated ratio of dedicated pilot power to element pilot power, as depicted at block 408. Normalizing the hypothesized dedicated pilot matches its amplitude to the received dedicated pilot, so that they may be compared.

After normalizing, the process computes a distance function, which produces a distance metric between a received dedicated pilot and each hypothesized dedicated pilot associated with a candidate set of adaptive array weights, as depicted at block 410. This distance function is minimized when the hypothesized dedicated pilot closely resembles the dedicated pilot that would have been received if the assumed candidate set of weights was used for transmission. The complexity of the distance function will vary depending upon the amount of a priori information the receiver has about the forward and reverse link channels, the error probabilities of the channels, and other factors. In a first embodiment of distance calculation, distance is computed as a probability. In a second embodiment, distance is computed as an error power.

In the first distance calculation embodiment, the probability that the $j^{th}$ candidate set of weights was used for transmission, $p(\hat{w}(j))$, is computed using the following functions, when element pilot powers are equal:

$$p(\hat{w}(j)) = \bar{p}(\hat{w}(j)) \text{fheight} \underline{p}(\hat{w}(j)) \qquad \text{Equation 6:}$$

$$\hat{p}(\hat{w}(j)) = \det(\pi\Sigma^2)^{-1} \exp(-(1+\gamma^2)\|\Sigma^{-1}(d-\gamma A\hat{w}(j))\|_2^2) \qquad \text{Equation 7:}$$

Where:

det( ), exp( ), $\| \ \|_2$ are the determinant, exponential, and vector 2 norm functions, respectively.

$\Sigma$ is a diagonal matrix with the form:

$$\Sigma = \begin{bmatrix} \sigma_1 & 0 & 0 & 0 \\ 0 & \sigma_2 & 0 & 0 \\ 0 & 0 & \ddots & 0 \\ 0 & 0 & 0 & \sigma_{LM} \end{bmatrix}$$

$\sigma_i$ is the standard deviation of the noise on the $i^{th}$ path d is the vector of received dedicated pilot signals, with L receive elements at the mobile when there are M taps in the channel impulse response.

$\gamma^2$ the ratio of the transmitted power on the dedicated pilot to the power on the element pilots.

$\hat{w}(j)$ is the $j^{th}$ vector of estimates of the weights used at the base $\hat{p}(\hat{w}(j))$ is the probability that the dedicated pilot was received, given that the weights $\hat{w}(j)$ were used at the transmitter.

$\bar{p}(\hat{w})$ is the probability that the weights $\hat{w}(j)$ were used at the transmitter, given w were requested. It is often reasonable to assume that the feedback channel has a known feedback error probability and that the feedback bit errors are independent. Under these conditions, $\bar{p}(\hat{w}(j))$ may be computed:

$$\bar{p}(\hat{w}(j)) = q^k(1-q)^{n-k} \qquad \text{Equation 8}$$

Where:

ŵ(j) is the estimate of the weight used at the base on the $j^{th}$ antenna k is the number of bit errors required in the weight feedback for the base to determine ŵ(j) was requested by the mobile instead of w.

n is the number of bits required to specify the array weights on the feedback channel.

q is the probability of feedback bit error.

The second distance calculation embodiment is a simplification of the first, where the probability of feedback error is not explicitly used in the estimation procedure. In this second approach, the error power between the hypothesized dedicated and received dedicated pilots is used:

$$e(j)=\|\Sigma^{-1}(d-\gamma A\hat{w}(j))\|_2^2 \qquad \text{Equation 9}$$

Here, each e(j) is computed for the $j^{th}$ hypothesized weight. The computed distance function produces a metric having a magnitude relative to the difference between the received dedicated pilot and the hypothesized dedicated pilot.

The computations in block 410 result in a set of distance values, where the set has a number of values equal to the number of candidate sets of adaptive array weights. It can be seen that minimizing the error power-based distance function over j is equivalent to maximizing the first, probability based distance function assuming that all feedback error sequences are equally likely. This approach is useful when there is insufficient information about the feedback channel error probabilities, or when other factors limit the receiver's ability to estimate the probability that the base will use a weight set requested by the receiver. Since this second metric requires somewhat less information, its use is preferred.

It may be observed that the receiver does not require knowledge of the code book used at the base if A is invertible, such as when the number of uncorrelated multipaths is equal to the number of transmit antennas. Under these conditions, simple linear least squares estimates of ŵ may be used, such as:

$$\hat{w}=(\gamma A)\#d \qquad \text{Equation 10}$$

where the superscript # indicates the pseudo inverse.

As a test of whether or not a set of weights may be accurately estimated, the process computes the ratio of the error power-based maximum distance value to the minimum distance value, as illustrated at block 412. If the computed ratio exceeds a predetermined threshold, at shown at block 414, the process selects the candidate set of adaptive array weights that corresponds to the minimum distance value computed in block 410, as illustrated at block 416.

If the probability-based distance metric is used, the difference between the estimates with maximum probability and minimum probability may be compared against a threshold.

If the ratio computed in block 412 does not exceed a predetermined threshold, the process does not have confidence in estimating adaptive array weights, and, rather than risking an improper estimation, the process selects the set of adaptive array weights that the receiver requested for the selected slot, as depicted at block 418.

Other methods of measuring the spread of distance values may be employed to indicate the weight estimation quality, or other measures may be used to determine that the weight estimation quality is poor. For example, if the measured signal-to-noise ratio of the received dedicated pilot is below a predetermined threshold, the process may select the set of adaptive array weights that the receiver requested for the selected slot, as depicted at block 418.

After selecting a candidate of adaptive array weights, or alternatively selecting the set of adaptive array weights requested by the receiver, the process terminates the adaptive array weight estimation process, as shown at block 420.

With reference now to FIG. 8, there is depicted a method and operation of estimating adaptive array weights used to transmit a communication signal, wherein the communication signal does not include a dedicated pilot. As illustrated, the process begins at block 500 and thereafter passes to block 502, wherein the process estimates the ratio of traffic channel power to element pilot power over the time of the current slot. This is similar to the process shown in block 404 in FIG. 7.

After estimating the ratio, the process selects a first candidate weight set from a group of weight sets that may have been used at the transmitter to transmit the communication signal, as illustrated at block 504.

Once the weight set has been selected, the process synthesizes a hypothesized dedicated pilot for the current slot using the selected candidate weight set and the received element pilots, as depicted at block 506. This pilot synthesis may be implemented as described and shown with reference to pilot synthesizer 208 in FIG. 3.

Next, the process demodulates the received communication signal, using the hypothesized dedicated pilot as a reference, to produce demodulated symbols, as illustrated at block 508.

Once the symbols are produced, the process removes the modulation from the received signal using the demodulated symbols, as depicted at block 510. Modulation removal may be implemented by multiplying the received signal by the inverse of the demodulated symbols.

Following the removal of the modulation, the remaining signal represents the signals transmitted from the antenna elements combined by the channel in additive noise.

Next, the process averages the modulation free signal over the current slot, as illustrated at block 512. This averaging reduces the effect of noise and symbol error. The averaged modulation free signal can be used, like the relatively low-power dedicated pilot, to provide a somewhat noisy or distorted estimate of the channels combined by the transmit weights. It may also be used in the same way as the relatively low-power dedicated pilot is used to allow estimation of the weights.

Next, the process normalizes the hypothesized dedicated pilot using information from the estimated ratio from block 502, as depicted at block 514.

After normalizing the hypothesized dedicated pilot, the process computes a distance between the modulation free signal and the hypothesized dedicated pilot, as illustrated at block 516. This computed distance is then stored for later analysis, as discussed in relation to block 522, below.

The process then determines whether or not all weight sets that may have been selected at the transmitter have been tested according to blocks 506 through 516, described above. As shown at block 518, if all weight sets have not been tested, the process selects the next candidate weight set, as depicted at 520, and returns to block 506 for further processing.

If the process determines at block 518 that all weight sets have been tested, including computing distances between the modulation free signal and the normalized hypothesized dedicated pilot-synthesized with each candidate weight set, the process compares the maximum and minimum distance, as illustrated at block 522. When the distance function is error power-based, the magnitude of a ratio of the maximum distance to minimum distance indicates whether or not an error is likely in the weight estimation process. A larger ratio indicates that one set of candidate weights is clearly better than at least one other set of candidate weights.

If this probability-based distance metric is used, the difference between the estimates with maximum probability and minimum probability may be compared against a threshold.

If, as shown at block 524, the computed ratio exceeds a threshold, the process selects the candidate set of adaptive array weights that corresponds to the minimum computed distance, as depicted at block 526. However, if the ratio does not exceed the threshold, which indicates a lack of confidence in the weight estimation process, the process selects a set of adaptive array weights that was requested by the receiver for the selected slot, as illustrated at block 528.

Following the selection of a set of adaptive array weights at either block 526 or 528, the process of estimating adaptive array weights used to transmit the communication signal ends, as depicted at block 530.

Turning now to FIG. 9, there is depicted a high-level block diagram of portions of receiver 700 that estimate adaptive array weights when a dedicated pilot is used to transmit a communication signal from a transmitter to a receiver in a wireless communication system, in accordance with the method and system of present invention. As illustrated, signals from antenna 201 are coupled to buffer 702, channel estimator 204, traffic channel power computer 704, element power computer 706, and dedicated pilot receiver 708, which is located within weight estimator 602.

Buffer 702 stores samples of the communication signal so that a representation of the signal is available for processing at various times before the buffer is eventually rewritten with a new set of samples.

Channel estimator 204 estimates a channel impulse response for each channel between each antenna element at the transceiver base station and antenna 201. Channel estimator 204 is more completely described above with reference to FIG. 2 and FIG. 3.

Traffic channel power computer 704 computes the power in the traffic channel. This may be implemented by despreading the traffic channel and averaging the power over the duration of a slot in order to compute the traffic channel power for a particular slot.

Element power computer 706 computes the power in the element pilots over the duration of a slot. This may be implemented in much the same way as traffic channel power computer 704, which is described above.

Buffer 702 is coupled to symbol demodulator 216. Symbol demodulator 216 demodulates traffic symbols, and may be implemented with a RAKE receiver.

Symbol demodulator 216 receives a demodulation reference from pilot synthesizer 208. Both symbol demodulator 216 and pilot synthesizer 208 were described previously, above.

As shown within weight estimator 602, dedicated pilot receiver 708 is also coupled to antenna 201. Dedicated pilot receiver 708 receives a dedicated pilot for a particular user and provides a dedicated pilot signal output coupled to distance calculator 710. Distance calculator 710 calculates a distance function between the dedicated pilot from dedicated pilot receiver 708 and a hypothesized dedicated pilot that has been synthesized by hypothesis pilot synthesizer 712. Distance calculator 710 may be implemented as described in relation to block 410 in FIG. 7, above.

Hypothesis pilot synthesizer 712 may be implemented as described in relation to block 406 in FIG. 7, above.

Distance calculator 710 also includes an input from ratio estimator 714, which provides an estimate of the ratio of a dedicated pilot power to element pilot power over a current time slot. This ratio is used by distance calculator 710 to scale the dedicated pilot provided by dedicated pilot receiver 708. Ratio estimator 714 receives estimates of power from traffic channel power computer 704 and element pilot power computer 706.

The output of distance calculator 710 is a distance value that is communicated to distance processor 716. Distance processor 716 collects values from distance calculator 710 and compares the maximum and minimum distances in a manner determined by whether the distance metric is probability-based or error power based, as described above in relation to block 412 in FIG. 7.

The comparison output by distance processor 716 is input to weight selector 718, which acts as a control function for weight estimator 602. Weight selector 718 is coupled to weight set memory 720, which stores information that receiver 700 knows about adaptive array weight sets that may be selected at the transmitter. Weight set memory 720 stores the code book, if a code book system is used at the transmitter and receiver in the communication system. Weight selector 718 selects the various weight sets that may be used at the transmitter and passes those weight sets to hypothesis pilot synthesizer 712 so that a hypothesized dedicated pilot may be computed using the received element pilots and each candidate set of adaptive array weights, as described in relation to block 406 in FIG. 7.

Weight selector 718 also makes a final selection for the estimated weight set that is used by pilot synthesizer 208 to produce a synthesized pilot for demodulating symbols in symbol demodulator 216. The final weight selection is made based upon information concerning distance ratios from distance processor 716 and delayed requested weights that receiver 700 has requested that the transmitter use. The requested weights are delayed for synchronizing a slot in which they were requested with a slot in which they were used by the transmitter. The final weight selection is described in FIG. 7 in relation to blocks 414–418.

Note that receiver 700 uses a dedicated pilot in weight estimator 602 to produce a weight set estimator for pilot synthesizer 208. Thus, receiver 700 operates in a manner depicted in the flowchart of FIG. 7. When a pilot signal is not used at the transmitter, the method of estimating weights shown in the flowchart of FIG. 8 is used.

Turning now to FIG. 10, there is depicted receiver 800 that estimates adaptive array weights when a dedicated pilot is not used to transmit a communication signal from a transmitter to a receiver in a wireless communication system. Receiver 800 includes many functional blocks similar to those shown in receiver 700 of FIG. 9. Where the functional blocks are substantially similar, the same reference numerals have been used. The differences between receiver 800 and 700 lie mainly within weight estimator 802, which includes modulation remover 804 and symbol demodulator 806.

In weight estimator 802, distance calculator 710 compares a hypothesized dedicated pilot output from hypothesis pilot synthesizer 712 and the output of modulation remover 804 in order to calculate a distance metric. Modulation remover 804 produces a residual signal that remains after symbols have been removed from a signal received by antenna 201 and buffered by buffer 702. The symbols that are removed from the signal are determined by symbol demodulator 806, which uses a hypothesized dedicated pilot, which is output by hypothesis pilot synthesizer 712.

Weight selector 718 operates as a controller for selecting array weights from weight set memory 720 in order to produce a series of hypothesized dedicated pilots.

Symbol demodulator 806 may be implemented in a manner similar to symbol demodulator 216, which has been discussed above. In some embodiments, symbol demodulator 806 and symbol demodulator 216 may be implemented in software running as multiple processes on the same digital signal processor.

Modulation remover 804 may be implemented with a divide function as described above in relation to block 510 in FIG. 8.

As with receiver 700 shown in FIG. 9, receiver 800 shown in FIG. 10 selects a final set of weights as the weight set estimate. These estimated weights are output by weight selector 718 and input into symbol demodulator 216, which finally demodulates symbols in a slot.

By estimating the weights used at the transmitter, receivers 700 and 800 are more likely to synthesize a pilot that produces a more accurate reference for demodulation. This is because a synthesized pilot based upon estimated weights is more likely to be based on the weights actually used by the transmitter rather than assuming the transmitter uses weights that are based upon information transmitted from the receiver. This is because information transmitted from the receiver may be corrupted in the uplink channel, or otherwise miscommunicated, which results in the transmitter using a set of adaptive array weights that is not anticipated by the receiver. When this invention is used to provide a more accurate demodulation reference, capacity may be increased because the transmitter does not use signal power to provide the accurate demodulation to the receiver. This saved signal power can be dedicated to the users' traffic signal.

In the embodiment of the invention described in relation to FIGS. 7 and 9, a dedicated pilot is transmitted and may be used by the receiver in estimating adaptive array weights used at the transmitter. The dedicated pilot signal may be further altered to indicate the adaptive array weights used at the transmitter For example, the dedicated pilot may be modulated with a symbol that indicates the code book entry containing the weights used by the transmitter. Alternatively, one of a set of dedicated pilots may be selected to indicate adaptive array weights used at the transmitter.

In a system that alters the dedicated pilot to communicate adaptive array weights used at the transmitter, the probability-based distance metric in equation 7 becomes:

Equation 11:

$$p(\hat{w}(j)) = det(\pi\Sigma^2)^{-1} \exp\left(-(1+\gamma^2)\left\|\Sigma^{-1}\sum_{t=1}^{T}(d(t)-\gamma\Delta_j(t)A\hat{w}(j))\right\|_2^2\right)$$

The variables used are the same as for equation 7, except for $\Delta_j(t)$, T, and d(t). $\Delta_j(t)$ is the modulating symbol associated with code book entry j for time instant t on the dedicated pilot, T is the number of modulating symbols per time slot, and d(t) is the vector of received dedicated pilot signals observed while $\Delta_j(t)$ is transmitted. For example, if there were two weight sets in the code book and only two modulating dedicated pilot symbols per slot, $\Delta_1(1)$ could be +1 and $\Delta_1(2)$ could be −1, and $\Delta_2(1)$ could be −1 and $\Delta_2(2)$ could be 1, for the first and second code book entries, respectively. Once the distance metric is computed, the remainder of the process is unchanged.

Likewise, the error power-based distance metric in equation 9 becomes:

Equation 12:

$$e(j) = \left\|\Sigma^{-1}\sum_{t=1}^{T}(d(t)-\gamma\Delta_j(t)A\hat{w}(j))\right\|_2^2$$

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a receiver for estimating adaptive array weights used to transmit a communication signal from a transmitter in a wireless communication system, wherein the transmitter uses adaptive array weights to modify a gain and a phase of the communication signal to produce a plurality of element communication signals coupled to antenna elements in an adaptive array antenna, the method comprising the steps of:

receiving the communication signal transmitted from the transmitter transmitting with the adaptive array antenna;

receiving an element pilot signal transmitted from an element in the adaptive array antenna; and estimating the adaptive array weights used at the transmitter in response to the received element pilot signal and the received communication signal.

2. The method for estimating adaptive array weights used to transmit a communication signal according to claim 1 further including the step of determining pilot synthesis weights for synthesizing a pilot in response to the estimated adaptive array weights.

3. The method for estimating adaptive array weights used to transmit a communication signal according to claim 1 wherein the adaptive array weights are selected from a plurality of predetermined sets of adaptive array weights, and wherein the step of estimating the adaptive array weights used at the transmitter further includes selecting one of the predetermined sets of adaptive array weights in response to the received element pilot signal and the received communication signal.

4. The method for estimating adaptive array weights used to transmit a communication signal according to claim 1 wherein the step of estimating the adaptive array weights used at the transmitter further includes estimating the adaptive array weights used at the transmitter by comparing characteristics of the received element pilot signal to characteristics of the received communication signal.

5. The method for estimating adaptive array weights used to transmit a communication signal according to claim 4 wherein the characteristics of the received element pilot signal and the characteristics of the received communication signal include, respectively, a channel estimate derived from the received element pilot signal, and an average representation of the received communication signal.

6. The method for estimating adaptive array weights used to transmit a communication signal according to claim 4 wherein the characteristics of the received element pilot signal and the characteristics of the received communication signal include, respectively, a channel estimate derived from the received element pilot signal, and a characteristic derived from a known sequence in the received communication signal.

7. The method for estimating adaptive array weights used to transmit a communication signal according to claim 4 wherein the characteristics of the received element pilot signal and the characteristics of the received communication signal include, respectively, a channel estimate derived from the received element pilot signal, and a characteristic derived from a modulation of a known sequence in the received communication signal.

8. The method for estimating adaptive array weights used to transmit a communication signal according to claim 2 wherein the step of determining pilot synthesis weights for synthesizing a pilot in response to the estimated adaptive array weights further includes the steps of:
   determining a quality of the estimated adaptive array weights; and
   in response to the quality of the estimated adaptive array weights falling below a threshold quality, selecting an alternative set of adaptive array weights as the pilot synthesis weights.

9. The method for estimating adaptive array weights used to transmit a communication signal according to claim 4 wherein the step of estimating the adaptive array weights used at the transmitter by comparing characteristics of the received element pilot signal to characteristics of the received communication signal further includes the steps of:
   selecting a set of candidate adaptive array weights;
   computing a hypothesized dedicated pilot in response to the selected set of candidate adaptive array weights and a channel estimate derived from the received element pilot;
   estimating a dedicated pilot in response to the received communication signal;
   computing a distance metric in response to the hypothesized dedicated pilot and the estimated dedicated pilot; and
   selecting the estimated adaptive array weights in response to the distance metric.

10. The method for estimating adaptive array weights used to transmit a communication signal according to claim 9 wherein the step of computing a hypothesized dedicated pilot in response to the selected set of candidate adaptive array weights and a channel estimate derived from the received element pilot further includes the steps of: p1 estimating a ratio of the power of the received element pilot signal to the power of the received communication signal; and
   scaling the hypothesized dedicated pilot relative to the estimated dedicated pilot in response to the estimated ratio.

11. A system in a receiver for estimating adaptive array weights used to transmit a communication signal from a transmitter in a wireless communication system, wherein the transmitter uses adaptive array weights to modify a gain and a phase of the communication signal to produce a plurality of element communication signals coupled to antenna elements in an adaptive array antenna, the system comprising:

means for receiving the communication signal transmitted from the transmitter transmitting with the adaptive array antenna;
   means for receiving an element pilot signal transmitted from an element in the adaptive array antenna; and
   means for estimating the adaptive array weights used at the transmitter in response to the received element pilot signal and the received communication signal.

12. The system for estimating adaptive array weights used to transmit a communication signal according to claim 11 further including means for determining pilot synthesis weights for synthesizing a pilot in response to the estimated adaptive array weights.

13. The system for estimating adaptive array weights used to transmit a communication signal according to claim 11 wherein the adaptive array weights are selected from a plurality of predetermined sets of adaptive array weights, and wherein the means for estimating the adaptive array weights used at the transmitter further includes means for selecting one of the predetermined sets of adaptive array weights in response to the received element pilot signal and the received communication signal.

14. The system for estimating adaptive array weights used to transmit a communication signal according to claim 11 wherein the means for estimating the adaptive array weights used at the transmitter further includes means for estimating the adaptive array weights used at the transmitter by comparing characteristics of the received element pilot signal to characteristics of the received communication signal.

15. The system for estimating adaptive array weights used to transmit a communication signal according to claim 14 wherein the characteristics of the received element pilot signal and the characteristics of the received communication signal include, respectively, a channel estimate derived from the received element pilot signal, and an average representation of the received communication signal.

16. The system for estimating adaptive array weights used to transmit a communication signal according to claim 14 wherein the characteristics of the received element pilot signal and the characteristics of the received communication signal include, respectively, a channel estimate derived from the received element pilot signal, and a characteristic derived from a known sequence in the received communication signal.

17. The system for estimating adaptive array weights used to transmit a communication signal according to claim 14 wherein the characteristics of the received element pilot signal and the characteristics of the received communication signal include, respectively, a channel estimate derived from the received element pilot signal, and a characteristic derived from a modulation of a known sequence in the received communication signal.

18. The system for estimating adaptive array weights used to transmit a communication signal according to claim 12 wherein the means for determining pilot synthesis weights for synthesizing a pilot in response to the estimated adaptive array weights further includes:
   means for determining a quality of the estimated adaptive array weights; and
   means for selecting an alternative set of adaptive array weights as the pilot synthesis weights in response to the quality of the estimated adaptive array weights falling below a threshold quality.

19. The system for estimating adaptive array weights used to transmit a communication signal according to claim 14 wherein the means for estimating the adaptive array weights used at the transmitter by comparing characteristics of the received element pilot signal to characteristics of the received communication signal further includes:

means for selecting a set of candidate adaptive array weights;

means for computing a hypothesized dedicated pilot in response to the selected set of candidate adaptive array weights and a channel estimate derived from the received element pilot;

means for estimating a dedicated pilot in response to the received communication signal;

means for computing a distance metric in response to the hypothesized dedicated pilot and the estimated dedicated pilot; and means for selecting the estimated adaptive array weights in response to the distance metric.

20. The system for estimating adaptive array weights used to transmit a communication signal according to claim 19 wherein the means for computing a hypothesized dedicated pilot in response to the selected set of candidate adaptive array weights and a channel estimate derived from the received element pilot further includes:

means for estimating a ratio of the power of the received element pilot signal to the power of the received communication signal; and means for scaling the hypothesized dedicated pilot relative to the estimated dedicated pilot in response to the estimated ratio.

\* \* \* \* \*

UNITED STATES PATENT AND TRADEMARK OFFICE
CERTIFICATE OF CORRECTION

PATENT NO.     : 6,434,366 B1
DATED          : August 13, 2002
INVENTOR(S)    : Harrison et al.

It is certified that error appears in the above-identified patent and that said Letters Patent is hereby corrected as shown below:

<u>Column 17,</u>
Line 54, after "the steps of", delete "p1"

Signed and Sealed this

Fifteenth Day of April, 2003

JAMES E. ROGAN
*Director of the United States Patent and Trademark Office*